United States Patent [19]

Klopp

[11] Patent Number: 4,694,863
[45] Date of Patent: Sep. 22, 1987

[54] PROTECTIVE CAP

[75] Inventor: James L. Klopp, Stow, Ohio

[73] Assignee: Cajon Company, Macedonia, Ohio

[21] Appl. No.: 819,237

[22] Filed: Jan. 15, 1986

[51] Int. Cl.$^4$ ............................................. F16L 57/00
[52] U.S. Cl. .................................................. 138/96 R
[58] Field of Search .......................... 29/277, 428, 525;
 138/89, 90, 92, 96 R, 96 T; 228/219; 285/353

[56] References Cited

U.S. PATENT DOCUMENTS

| | | | |
|---|---|---|---|
| 1,147,840 | 7/1915 | Bowser | 137/316 |
| 1,726,483 | 8/1929 | Giesler | 285/18 |
| 1,847,391 | 3/1932 | Fisher | 138/96 R |
| 1,860,886 | 5/1932 | Brownstein | 138/96 T |
| 1,887,332 | 11/1930 | Shrum | 138/96 R |
| 2,028,576 | 1/1936 | Van Dyke | 138/96 R |
| 2,334,424 | 11/1943 | Livermont | 138/96 T |
| 2,954,804 | 10/1960 | Heil | 138/96 T |
| 4,362,323 | 12/1982 | Lodder et al. | 285/4 |
| 4,518,017 | 5/1985 | Hennon et al. | 138/96 R |

FOREIGN PATENT DOCUMENTS

| | | | |
|---|---|---|---|
| 669537 | 8/1963 | Canada | 138/96 T |
| 3208495 | 9/1983 | Fed. Rep. of Germany | |
| 1602077 | 11/1981 | United Kingdom | |

Primary Examiner—Stephen Marcus
Assistant Examiner—Mark Thronson
Attorney, Agent, or Firm—Fay, Sharpe, Beall, Fagan, Minnich & McKee

[57] ABSTRACT

A protector for the end face of a fluid conduit member comprises an annular body portion and an end wall provided on one end of the annular body portion. The end wall extends radially and axially inwardly of the annular body portion and can have a substantially centrally disposed aperture therethrough. The aperture is positioned to open generally in alignment with a bore of an associated fluid conduit member on which the protector is positioned.

22 Claims, 4 Drawing Figures

PROTECTIVE CAP

BACKGROUND OF THE INVENTION

This invention pertains to the art of fluid conduits and, more particularly, to an improved protective cap for the end face of such a conduit.

The invention is particularly applicable to a protective cap adapted to shield the sealing beads of a gland member used in a tube coupling assembly before the gland member is coupled to a second gland member and will be described with reference thereto. However, it will be appreciated by those skilled in the art that the invention has far broader applications and may be adapted for use in a wide variety of environments where a protective cap is employed and where it is desired to shield or protect an end or sealing face of a fluid conduit prior to its use in a fluid line system.

One particular known type of gland member utilized in tube coupling assemblies has an end face provided with a ring-like sealing bead. The bead has a highly polished sealing surface and any nicks or scratches on it impede proper sealing. This is particularly important if the gland is used in the handling of harmful gases such as, for example, cyanide, which is widely used in the semi-conductor industry. In general, tube coupling members which are designed for use at both high and low temperatures and at both high pressures and vacuums must have smooth and polished sealing surfaces in order to preserve the capacity to seal under such varying temperature and pressure conditions. It is thus necessary to protect the sealing surfaces of a tube coupling member prior to its installation in a tubing system.

Although several types of end protector caps are known for pipe ends, none of these had the particular characteristics necessary for protecting the sealing surfaces of a fluid conduit member in an adequate manner. With regard to known metal protective caps, none of these is so configured that an end face of the cap is spaced from the sealing face of the associated fluid conduit to prevent the scratching or marring of the sealing face. Moreover, none of the known protective caps is so configured as to allow the purging of gases from the associated fluid conduit member when it is being welded to another fluid conduit member. Also, unless the protective cap is made of a metal compatible with the metal from which the fluid conduit is made, galvanic corrosion between the two might occur in corrosive environments.

Another known type of protector cap is made of plastic which has the disadvantage that it releases particulates and/or hydrocarbons onto the sealing face of the fluid conduit member. Moreover, plastic caps cannot withstand the same temperatures and chemicals as the metal conduit members they are meant to protect and thus afford inadequate protection in hostile environments.

The present invention contemplates a new and improved protective cap member which is simple in design, effective in use, and overcomes the foregoing difficulties and others while providing better and more advantageous overall results.

BRIEF SUMMARY OF THE INVENTION

In accordance with the present invention, a new and improved protective cap is provided which is adapted to cover the end face of a fluid conduit member.

More particularly, in accordance with the invention, the protector includes an annular body portion and an end wall provided on one end of the annular body portion. The end wall extends axially and radially inwardly of the annular body. The wall terminates in a substantially centrally disposed aperture which opens into a bore of an associated fluid conduit member on which the protector is positioned.

In accordance with another aspect of the invention, the protector further includes a blocking means for preventing the assembly of the associated fluid conduit member on which the protector is positioned to a second associated fluid conduit member. Preferably, the blocking means comprises an outwardly flaring section of the annular body portion opposite the one end.

According to another aspect of the invention, the protector also includes fastener means for holding the protector to the associated fluid conduit member. The fastener means preferably comprises a plurality of spaced, inwardly extending resilient tangs formed in the annular body portion. In the preferred embodiment, three tangs are spaced equally around the circumference of the annular body portion.

According to a further aspect of the invention, the protector further includes obstructing means for preventing the protector from being pushed so far onto the fluid conduit that the protector end face could contact a sealing bead located on an end face of the fluid conduit. Preferably, the obstructing means includes a ramp section of each resilient tang.

In accordance with a still further aspect of the invention, the annular re-entrant flange can support an associated tube which is used in purging gas from a bore in the associated fluid conduit member.

According to still another aspect of the invention, the annular body portion has the shape of a right circular cylinder and the protector is constructed of a relatively thin generally rigid material.

One advantage of the present invention is the provision of a new protective cap which can be used to protect a highly polished sealing surface, such as a sealing bead, located on a first end face of a fluid conduit member such as a gland from nicks, cuts, scratches, and weld spatter which would impede proper sealing.

Another advantage of the invention is the provision of a protective cap which is provided with an end face having a generally centrally disposed hole or aperture therein to preclude any possibility of accidental pressure containment. The end face hole opens into a bore of the gland and allows purge gas to exit or enter during the welding of a second end of the gland while the cap provides protection for the sealing bead on the first end of the gland. The end face hole also allows for the internal inspection of the gland from its end without accidental damage from inspection tools.

Still another advantage of the invention is the provision of a protector having an annular re-entrant flange extending inwardly around the end face aperture. The re-entrant flange allows a soft tube or the like to be inserted directly into the gland to supply purge gas during welding.

Yet another advantage of the protector is the provision of a blocking means for preventing the joining of the associated gland on which the protector is positioned, to a second gland. In other words, the fluid connection of which the gland is a part cannot be accidentally assembled while the protective cap is in place. The blocking means preferably comprises an outwardly flaring end section of the annular body portion opposite the end on which the end wall is provided.

Still yet another advantage of the present invention, is the provision of a protector with fastener means for holding the protector on the gland. The fastener means preferably comprises a plurality of spaced, inwardly extending resilient tangs disposed on the annular body of the protector. The tangs are preferably so spaced that the protective cap is self-centering during installation thereby reducing the chance of accidental damage to the gland end face when the cap is being installed.

A further advantage of the present invention is the provision of a protector with obstruction means for preventing the protector from being pushed so far onto the gland that the sealing bead thereon could be contacted by the protector end face. The obstruction means preferably comprises a ramp-like section of each tang provided on the annular body of the protector.

Yet still another advantage of the present invention is the provision of a protective cap made of the same metallic material as the gland thereby reducing the chances of galvanic corrosion between the cap and the gland even in corrosive environments. The protective cap can thus withstand the same temperatures and chemicals as the gland itself, thereby protecting the end face of the gland even in hostile environments. Also, the provision of a metal cap enables the cap to be rendered as clean as the gland itself thereby reducing contamination of the gland or fluid conduit member.

A yet further advantage of the present invention is the provision of a protective cap which can be reused several times.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
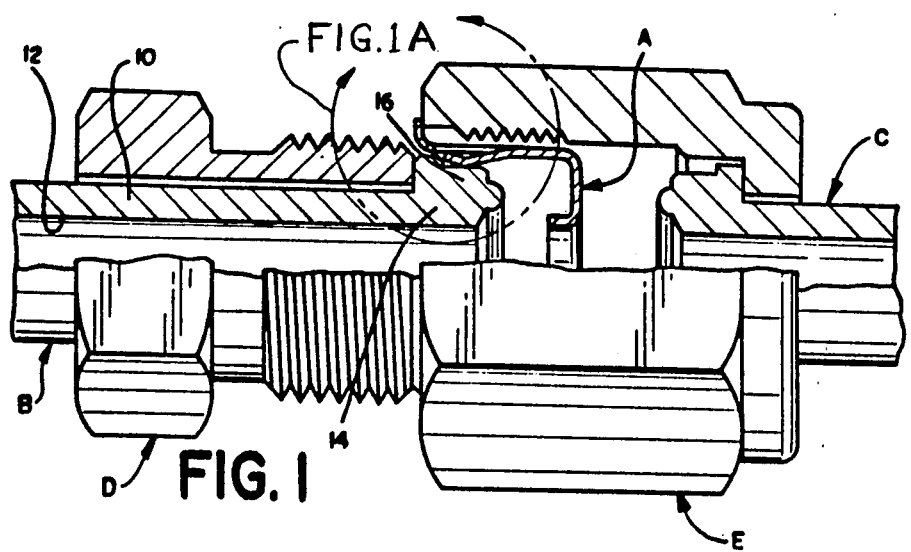
FIG. 1 is a side elevational view in partial cross-section of a protective cap according to the present invention in use on a fluid conduit member, the assembly in which the fluid conduit member is used is also shown.

Referring now to the drawings wherein the showings are for purposes of illustrating a preferred embodiment of the invention only and not for purposes of limiting same, FIG. 1 shows the protective cap A of the present invention in use on a first conduit body B. While the protective cap is primarily designed for and will hereinafter be described in connection with a conduit, tube, or gland member of a particular given shape, it will be appreciated that the overall inventive concept involved could be adapted for use in fluid conduits having a variety of shapes. The fluid conduit assembly of which the first fluid conduit body or gland B is a component also includes a second conduit body or gland C, a gland nut D, and a coupling nut E.

Figure 1A:
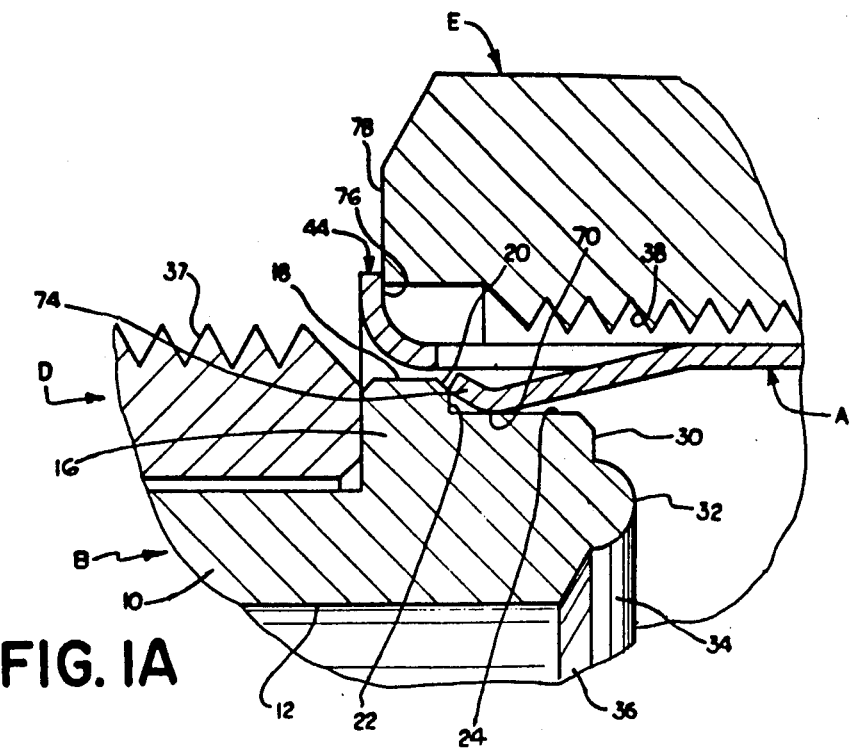
FIG. 1A is a greatly enlarged view of a portion of FIG. 1.

More particularly, the first conduit body B includes a cylindrical section 10 having therein a longitudinally extending bore 12. A first end 14 of the conduit body is provided with a flange section 16 and a second end (not illustrated) can be given any desired conventional shape. With reference now also to FIGURE 1A, the flange section 16 includes an outwardly facing first annular face 18, a beveled face 20, and a shoulder section 22. A reduced diameter second annular face 24 leads from the shoulder section 22 to a transversely extending end face 30 of the first conduit body B. Projecting outwardly from the end face 30 is a rib or bead 32 which has a generally semi-circular cross-section and includes a sealing surface 34. The bead 32 preferably extends uninterruptedly along the surface of the end face 30 and circumferentially about the bore 12. Positioned radially inwardly of the rib 32 is a frusto-conical surface 36.

In use, the gland nut D is slipped over the cylindrical section 10 of the first conduit body B and is pushed forward until it abuts the flange 16 thereof. The coupling nut E is similarly pushed onto the second conduit body or gland C until it abuts a flange member thereof. It will be apparent that the flange 16 of conduit body B is identical in shape to the flange of conduit body C. Thus a protective cap could also be positioned on conduit C before the coupling not E is pushed onto the conduit C such that the nut abuts the conduit flange. For the sake of brevity, however, only the protective cap A is illustrated in FIG. 1 as being applied on the conduit B and only that cap will be described herein. Since the conduit bodies B, C have identical adjacent ends, however, it should be recognized that a protective cap for the conduit body C will have features identical to those of the protective cap for conduit body B.

The gland nut D and coupling nut E are respectively provided with suitably shaped threaded sections 37,38 which are adapted to cooperate and interengage to pull the two conduit bodies B and C into close proximity with each other. As mentioned, the protective cap or shipping cap A of the present invention is adapted to protect the sealing surface 34 on the conduit body B before the conduit body is connected into a tube coupling assembly. In use, a suitable conventional generally annular sealing gasket (not illustrated) is normally positioned between the sealing surfaces of the two conduit bodies B, C to provide a fluid-tight seal therebetween.

With reference now to FIG. 5, the protective cap A has a tubular body 40 which includes a cylindrical section 42 of a diameter at least slightly greater than annular face 24 of conduit body B. At a first end of the body 40 there is a blocking means for preventing the inadvertent assembly of the first conduit B to the second conduit C. The blocking means can be in the form of an outwardly flared end section 44 which is preferably integral with the cylindrical section 42. As shown in FIG. 1, the end section 44 extends radially outwardly a sufficient distance bdyond surface 18 to prevent threads 38 from engaging threads 37. The cylindrical section 42 can have the shape of a right circular cylinder if desired, although other geometric shapes would also be feasible.

Provided on a second end of the cylindrical section 42 is an integral end wall 50 which extends radially and axially inwardly of the cylindrical section 42. The end wall 50 preferably terminates in an aperture 52 which extends transversely therethrough. The diameter of aperture 52 is desirably less than the inner diameter of the sealing area of end face 30. Desirably, the diameter of the aperture 52 is not less than the diameter of the longitudinally extending bore 12.

In the embodiment illustrated, the end wall 50 includes a first section 51 which extends transversely of cylindrical section 42 and a second section in the form of a re-entrant flange 54 disposed around the end wall aperture 52. The flange 54 can extend approximately parallel to cylindrical section 42 of the protective cap A. Although the flange section is illustrated as extending only a short way into the cylindrical section 42 (approximately a quarter of the length of the cylindrical section), it is evident that the flange section could also extend somewhat further into the section 42 if that were desired. Moreover, it would also be conceivable to provide the flange section with a plurality of ribs or steps of different diameters if that were considered desirable or necessary.

The center aperture or hole 52 of the protective cap A is advantageous because it enables the internal inspection of the first conduit body B without accidental damage from the inspection tools to the sealing surface 34 thereof. Moreover, the center hole 52 precludes the possibility of accidental pressure containment in the conduit body. The provision of the annular re-entrant flange 54 around the center aperture 52 allows a soft tube or the like (not illustrated) to be inserted directly into the conduit body B to supply purge gas during welding. Thus the flange allows purge gas to exit or enter during the welding of a second end of the conduit body B while the cap A still provides protection to sealing surface 34. Moreover, the center hole allows vacuum bagging for shipment without retaining air inside the conduit body B and this leads to a cleaner package.

Figure 2:
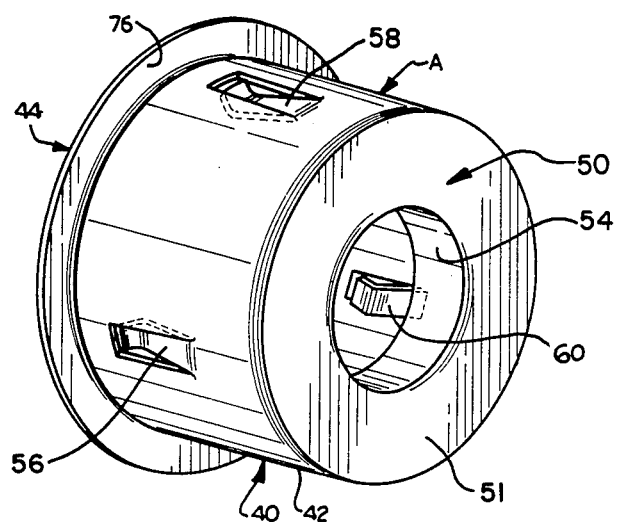
FIG. 2 is an enlarged perspective view of the protective cap of FIG. 1.

Also provided is a fastener means for selectively holding the cap A on the conduit body B to allow the cap to perform its protective function. Preferably, the fastener means is in the form of a plurality of tangs provided in the cylindrical section 42 of the tubular body. In the preferred embodiment illustrated in FIG. 2, three tangs, 56, 58, and 60 are shown with the tangs being equally spaced around the circumference of the cylindrical section 42. It should, however, be obvious that a larger or smaller number of tangs could also be utilized as desired or necessary. Moreover, tangs having configurations other than the one illustrated could be used if desired. The tangs can be made integral with the tubular body 40 such that they are inwardly extending resilient sectios thereof. Each of the tangs can be defined by a pair of spaced parallel slots 62, 64 between which the tubular body section is inwardly depressed to form a shallow V. The depression can have a smooth contact face. It should also be obvious that other types of fastener means for holding the cap A on the gland B could also be utilized.

Figure 3:
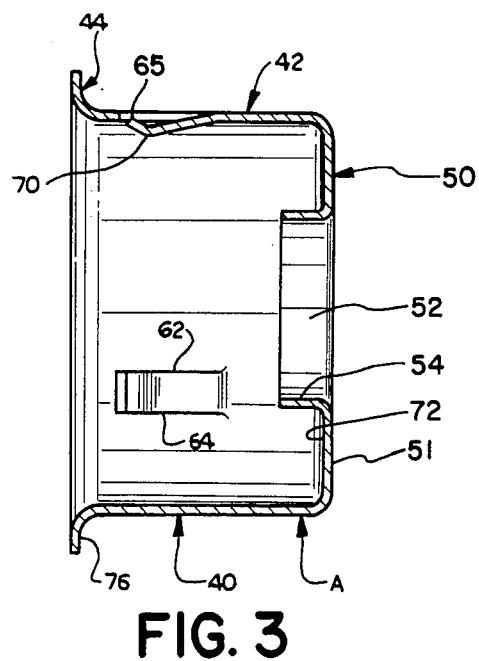
FIG. 3 is a longitudinal cross-sectional view of the cap of FIG. 2.

A free end 65 of each tang can be spaced inwardly of the cylindrical body 42 as is illustrated in FIG. 3, although the free end could terminate at the level of the cylindrical body as well. It should also be appreciated, however, that both ends of each tang could be integral with the cylindrical body section 42, should that be desired, if the cap A were made from a suitable material.

With reference now again to FIG. 1A, an inner surface 70 of each shallow V-shaped tang is adapted to resiliently contact and frictionally engage the annular second outer face 24 of the first conduit body B. In addition, an obstructing means is provided for preventing the protective cap A from being slid down the conduit body B to such an extent that an inner surface 72 (see FIG. 3) of the cap end wall 50 could contact the conduit body sealing surface 34. Preferably, a ramp-like section 74 of each tang contacts either the beveled face 20 or the shoulder section 22 provided on the conduit body flange 16 to prevent sliding of the cap A onto the conduit B past a selected point. Contact between the cap end wall inner surface 72 and the bead 32 would be undesirable since it could mar the smooth finish on the sealing surface 34 and might lead to scratches or cuts therein.

The tubular body end section 44 is also adapted to function as a blocking means for preventing the assembly of the associated first conduit body B with the second conduit body C when the protective cap A is in place. This is accomplished by having an outer surface 76 of the end section 44 contact a coupling nut surface 78. This prevents the coupling nut E from being pushed far enough onto the gland nut D that the threaded portions 37, 38 of these two members could interengage. Once the protective cap A is removed, however, the gland nut D can be threaded into the coupling nut E to draw the first and second conduit bodies B and C adjacent to each other. The protective cap A thus also serves the additional purpose of reminding the assembler that a suitable gasket ought to be interposed between the first and second conduit bodies.

Preferably, the protective cap A is made from the same material as the conduit body B. Both parts are generally made of a metal which can, for example be stainless steel. In this way, the cap can be rendered as clean as the part itself thereby reducing contamination of the conduit body. Moreover, a metallic cap, as mentioned, does not release particulates or hydrocarbons onto the conduit body B as would a plastic cap. Also, the use of compatible materials reduces the chance of galvanic corrosion between the cap and the coupling body even in a corrosive environment.

If desired, the cap A can be made from a relatively thin stainless steel sheet metal in a stamping operation or the like. The thickness of the sheet metal from which the cap can be made is dependent to some extent on the diameter of the gland or fluid conduit B which is to be protected since for larger conduit sizes a thicker metal might be required.

In general, the cap A is meant to shield the sealing surface of the conduit body B whenever the fluid conduit system in which the body B is used is unassembled. Once the protective cap is removed from the coupling body B, it can be reused and this is advantageous from a material and cost standpoint.

The specific dimensions of the protective cap are, of course, subject to variation depending upon the dimensions of the conduit body B. In one embodiment, however, the cap can be approximately 0.33 inches (0.85 cm) long overall. The cap can have a diameter at the cylindrical section 42 of approximately 0.46 inches (1.17 cm) and a diameter at the widest point of the flared end approximately 0.63 inches (1.60 cm). The re-entrant flange portion can extend back approximately 0.06 inches (0.15 cm) into the body with the end wall aperture having a diameter of approximately 0.23 inches (0.58 cm).

The present invention thus discloses a protective cap for the sealing surface on an end face of a fluid conduit member to protect the sealing surface from scratches, nicks, cuts, and weld spatter which would impede proper sealing. The protective cap is so dimensioned that it fits onto the associated fluid conduit member in a selectively detachable manner. Moreover, the protective cap is so configured that an end wall of the cap is spaced away from the sealing surface of the conduit to prevent contact therebetween. The protective cap can also be provided with an aperture in the end wall and an annular re-entrant flange around the aperture to allow for visual inspection of the conduit and for gas purging when the conduit is being welded. The protective cap can be used on the fluid conduit member both during shipping of the conduit and during maintenance of the system or assembly in which the conduit is used. Thus, the cap is reusable.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A protector for the end of a fluid conduit, said conduit including a cylindrical end portion with an inwardly extending flow passage having a generally transverse sealing face located circumferentially about the outer end thereof and a flange positioned about the exterior of the cylindrical end portion at a location spaced inwardly from the sealing face; said protector comprising:
  an annular body portion having first and second ends, said first end having an inner diameter for closely receiving the cylindrical end portion of the conduit;
  an end wall on said second end of said annular body portion, said end wall extending radially and axially inwardly of the annular body portion to a centrally disposed aperture opening to the interior of said annular body portion, said aperture located to be in general alignment with the flow passage of the conduit when the annular body portion receives the cylindrical end portion of the conduit, wherein said aperture has a diameter at least approximately two thirds as large as a diameter of said annular body portion; and,
  fastener means integral with said body portion for selectively holding the protector on an associated fluid conduit, said fastener means comprising a plurality of spaced resilient V-shaped tangs each having a smooth contact face means for slidingly engaging a cylindrical outer periphery of the associated fluid conduit.

2. The protector of claim 1 wherein said end wall includes a first section which extends transversely inwardly from said second end of said body portion and a second section which extends axially into said annular body portion from a radially innermost edge of said first section.

3. The protector of claim 1 further comprising blocking means for preventing an associated fluid conduit on which the protector is positioned from being connected to a second associated fluid conduit.

4. The protector of claim 3 wherein said blocking means comprises an outwardly flaring end section provided on the first end of said annular body portion, said end section extending at approximately 90° to the axis of said annular body portion.

5. The protector of claim 1 wherein three such tangs are provided, said tangs being equally spaced around the circumference of said annular body portion.

6. The protector of claim 1 further comprising obstructing means for limiting movement of said protector onto the end portion of the associated fluid conduit to prevent said protector end wall from contacting a sealing face on the associated fluid conduit.

7. The protector of claim 6 wherein said obstructing means includes a ramp section of at least one of said tangs provided on said body portion, said ramp section being positioned to engage a flange on the associated fluid conduit.

8. The protector of claim 1 wherein said annular body portion has the shape of a right circular cylinder and wherein the protector is constructed of a relatively thin generally rigid material.

9. A device for protecting a sealing surface located on an end of a tube or conduit, comprising:
  an integral cup-shaped body adapted to be placed over the end of an associated tube member comprising:
    an annular wall portion,
    an inwardly extending end wall provided on one end of said annular wall portion, said end wall having a centrally disposed aperture therethrough, and
    an annular re-entrant flange which extends from said end wall back into said annular wall portion around said end wall aperture;
  fastener means for selectively holding said cup-shaped body on said associated tube member wherein said fastener means comprises a plurality of spaced inwardly extending resilient V-shaped tangs formed in said body annular wall portion, said tangs each having a smooth contact face which is adapted to slidingly engage a cylindrical outer periphery of the associated tube member and wherein said tangs are so located that they are bisected by a plane extending transversely to a longitudinal centerline of said cup-shaped body; and,
  obstructing means for preventing the device from being pushed so far onto said associated tube member that said protector end wall would contact a sealing surface of said associated tube member and wherein said obstructing means comprises a ramp-like section of at least one of said tangs provided on said annular wall portion.

10. The device of claim 9 further comprising blocking means for preventing the assembly of said associated tube member to another tube member.

11. The device of claim 10 wherein said blocking means comprises an outwardly flaring end section provided on another end of said annular wall portion, said end section extending approximately transversely to the axis of said cup-shaped body.

12. A fitting and reusable cup-shaped protector assembly, comprising:
  a fitting, one end of which has on an end face thereof a highly polished sealing bead; and,
  a protector comprising:
    a cylindrical body section adapted to surround said one end of said fitting;
    a transverse end wall extending inwardly from a first end of said cylindrical body section, said end wall being adapted to protect said fitting sealing head from nicks, scratches, and weld spatter which would impede proper sealing;

a substantially centrally disposed aperture extending through said end wall;

an annular re-entrant flange disposed around said end wall aperture and merging into said end wall; and, an outwardly flaring end section extending from a second end of said cylindrical body section.

13. The assembly of claim 12 further comprising a fastener means for selectively securing said body section on an associated fitting, said fastener means including a plurality of spaced inwardly extending resilient tangs integral with said body section.

14. The assembly of claim 12 wherein said fitting and said protector are made from substantially the same metallic material to reduce the possibility of galvanic corrosion between said protector and said fitting.

15. The assembly of claim 12 wherein said fitting includes a longitudinally extending bore, and wherein said body end wall aperture has a diameter at least as large as a diameter of said fitting bore.

16. A protective assembly, comprising:
a fluid conduit including:
a first cylindrical end portion having an end face,
a flow passage extending into said end portion from said end face,
a sealing face located on said end face and positioned circumferentially about said flow passage, and
a flange positioned on said cylindrical end portion and spaced inwardly of said end face; and,
a protector for said conduit first end portion, including:
an annular body portion having first and second ends, said first end having an inner diameter for closely receiving said cylindrical end portion of said fluid conduit and said second end having an end wall,
obstructing means integral with said body portion and cooperating with said fluid conduit flange to limit the movement of said protector onto said fluid conduit first end portion to prevent said protector end wall from contacting said sealing face on said fluid conduit,
an aperture extending transversely through said end wall, and
an annular re-entrant flange which extends from said end wall back into said annular body portion around said aperture.

17. The assembly of claim 16 wherein said protector further comprises blocking means integral with said body portioin for preventing said fluid conduit from being connected to a second fluid conduit.

18. The assembly of claim 17 wherein said blocking means comprises an outwardly flaring end section provided on said first end of said protector.

19. The assembly of claim 16 wherein said protector further comprises fastener means for selectively holding said protector on said fluid conduit.

20. The assembly of claim 19 wherein said fastener means comprise a plurality of resilient tangs adapted to engage said fluid conduit cylindrical end portion.

21. The assembly of claim 20 wherein said fluid conduit first cylindrical end portion has a smooth exterior periphery and said plurality of resilient tangs are adapted to slide axially onto said conduit end portion over said exterior periphery thereof.

22. The assembly of claim 16 wherein said end wall of said protector second end extends radially and axially inwardly of said annular body portion to said aperture which is centrally disposed on said end wall.

* * * * *